July 23, 1968 B. R. GOOCH 3,394,362

MAGNETIC HEAD ASSEMBLY WITH RECEIVERS FOR POLE PIECES

Original Filed Sept. 13, 1963 3 Sheets-Sheet 1

BEVERLEY R. GOOCH
INVENTOR.

BY Stuart Lubitz
ATTORNEY

MAGNETIC HEAD ASSEMBLY WITH RECEIVERS FOR POLE PIECES

Original Filed Sept. 13, 1963 3 Sheets-Sheet 2

BEVERLEY R. GOOCH
INVENTOR.

BY Stuart Lubitz
ATTORNEY

July 23, 1968 B. R. GOOCH 3,394,362

MAGNETIC HEAD ASSEMBLY WITH RECEIVERS FOR POLE PIECES

Original Filed Sept. 13, 1963 3 Sheets-Sheet 3

BEVERLEY R. GOOCH
INVENTOR.

BY Stuart Lubitz
ATTORNEY

United States Patent Office 3,394,362

Patented July 23, 1968

3,394,362

MAGNETIC HEAD ASSEMBLY WITH RECEIVERS FOR POLE PIECES

Beverley R. Gooch, Sunnyvale, Calif., assignor to Ampex Corporation, Redwood City, Calif., a corporation of California Continuation of application Ser. No. 308,812, Sept. 13, 1963. This application May 18, 1967, Ser. No. 646,135
10 Claims. (Cl. 340—174.1)

ABSTRACT OF THE DISCLOSURE

A magnetic head structure having core members of a ferrite material and of a preformed configuration. Spanning across the core members are individual pole pieces each completing a magnetic circuit. The core members are designed to accommodate a preselected number of pole pieces within preadjusted positional relationship according to the specific application and number of pole pieces.

This is a continuation of patent application Ser. No. 308,812, filed Sept. 13, 1963, and now abandoned, entitled, Magnetic Head Assembly, by the present inventor.

This invention relates generally to magnetic head structures and more particularly to erase heads for removing signals from magnetic media having known track formats.

The prior art magnetic heads generally employ individual magnetic cores or heads placed side by side in a molded plastic or brass housing. This type of structure is shown in U.S. Patent 2,888,522 issued on May 26, 1959, to S. P. McCutchen et al. When this configuration is utilized each change in track size or format requires that a different head structure and a different plastic housing be made. This necessitates a multiplicity of molds for molding the housings and it also requires the forming of a multiplicity of different head or core units. This substantially increases the cost of each head assembly and decisively limits the flexibility in track format selection.

It is a purpose of this invention to overcome the above mentioned limitations and cost penalties by providing a new magnetic head structure wherein the change in head structure required by a change in the track format is minimized. To accomplish this the head structure of the invention comprises a low magnetic loss means, and a means for receiving this low loss means at any position along its length. The means for receiving which may take the form of a core member or a pair of C-shaped channel members is made from a low magnetic loss material. The low magnetic loss means may take the form of a center bar that is placed between and across the pair of C-shaped channel members to complete a magnetic circuit having a plurality of nonmagnetic gaps. The assembly of the channel members and the center bar is held in a fixed relation by a means for holding, such as a plastic capsule of epoxy resin.

In accordance with the present invention, when the track size or format is changed it is only necessary to alter the position or size of the center bar or alter the number of these center bars placed across the channel members. The simplicity of this change greatly facilitates the manufacture of a magnetic head assembly for different track formats. It has been estimated that a substantial cost saving will be realized by the utilization of this construction.

The general object of this invention is to provide an improved magnetic head assembly.

Another object of this invention is to provide a head assembly manufactured to conform to a known track format.

Another object of this invention is to provide a head assembly wherein a minimum of new component parts are required when the track format is changed.

Another object is to provide a method for readily assembling a magnetic head structure. Other objects and advantages will become obvious when the detailed description is considered in conjunction with the drawings wherein.

The specific description of the invention is directed to an erasing head of the type and class described in British Patent 911,220, issued to Telefunken Corporation on Nov. 21, 1962. This type of erasing head generally employs a plurality of nonmagnetic gaps formed by a core and a center bar having an energizing coil. It should be understood that the magnetic head structure of this invention may readily be applied to the many other types of erase head assemblies and magnetic head assemblies used in the magnetic recording and reproducing art.

Figure 1:
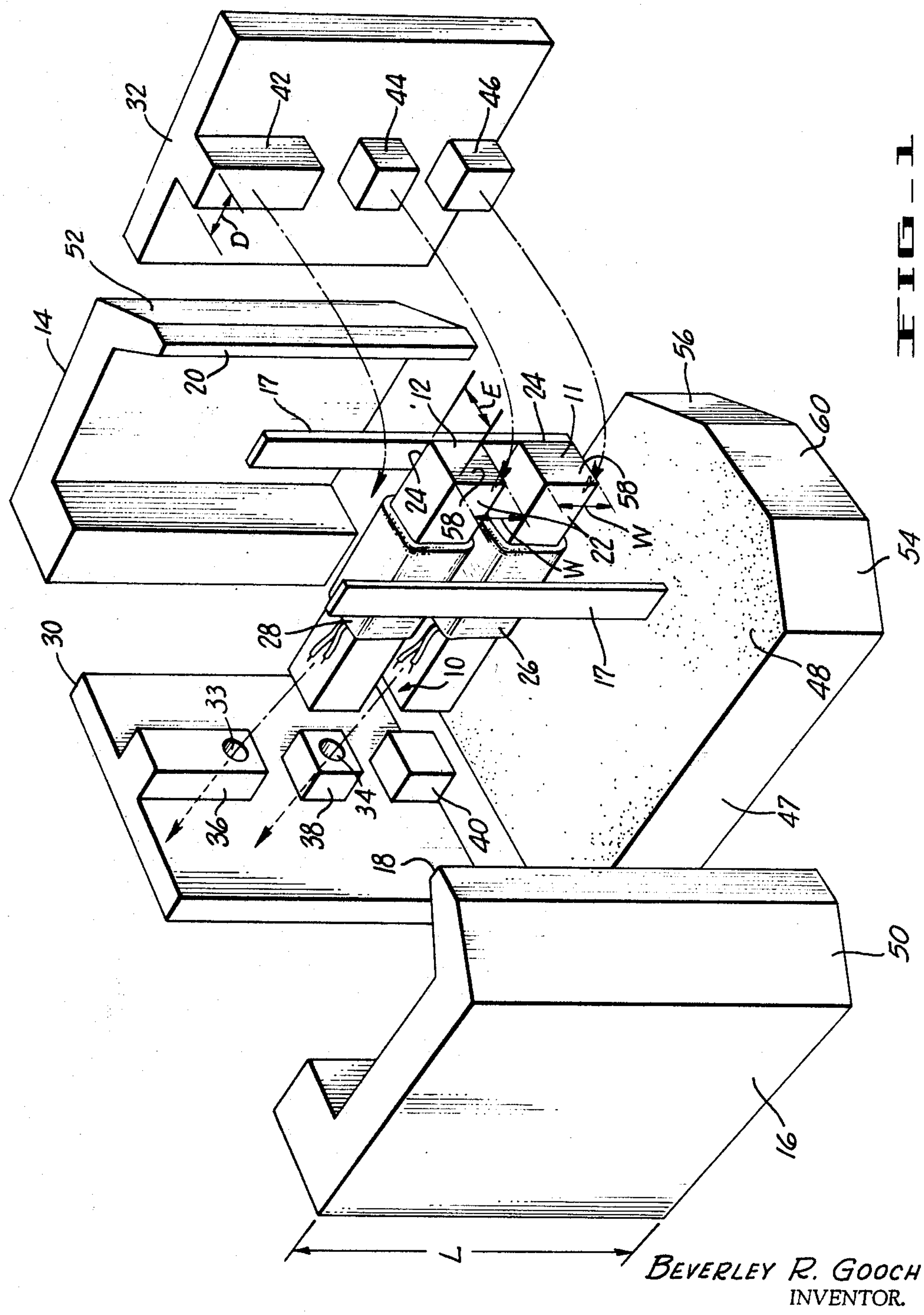
FIGURE 1 is an exploded, perspective view of the magnetic head assembly before it is assembled and placed in the potting fixture.

Referring specifically to FIGURE 1, the component parts of the magnetic head assembly are shown prior to assembly. The parts of the magnetic head assembly include a low magnetic loss means referred to by the general reference character 10 and illustrated in the form of a pair of center bars 11 and 12 made from one of the well known ferrite compositions. The center bars 11 and 12 are adapted to be placed longitudinally across a common pole core or more specifically a pair of preformed C-shaped channel members 14 and 16 which are also made from one of the well know ferrite materials. It should be noted that the longitudinal lengths of the channel members 14 and 16, designated by the dimensional arrow and the symbol L, are considerably greater than the width W of the center bars 11 and 12. The channel members 14 and 16 may be considered a means for receiving the low magnetic loss means 10 so that the center bars 11 and 12 may be selectively proportioned and adjustably positioned normal to the longitudinal axes of members 14 and 16.

When the center bars 11 and 12 are assembled so as to span across the channel members 14 and 16 a pair of nonmagnetic gap spacers 17 are inserted and sandwiched between the confronting vertical edge surfaces 18 and 20 of the channel members 14 and 16 and the surfaces 22 and 24 of the center bars 11 and 12. These nonmagnetic gap spacers 17 may be made from copper foil and they may be aligned so that the abutment of the surfaces 18 and 22 and the surfaces 20 and 24 will retain the spacers in the desired position. It is within the scope of the invention to align the gap spacers 17 in other ways such as by placing the gap spacers 17 beneath the coils 26 and 28 located on the center bars 11 and 12. The gap spacers 17 may also be formed by the well known techniques of vacuum deposition or electroplating.

The center bars 11 and 12 are located three-dimensionally by a pair of Bakelite plates 30 and 32. The Bakelite plate 30, in addition to forming a positioning means for the purposes of assembly, functions as a terminal board in the completed assembly. The terminal board or plate 30 has a plurality of apertures 33 and 34 placed in the positioning surfaces or abutments 36 and 38. These apertures 33 and 34 enable the leads of the coils 26 and 28 to pass through the terminal board 30 and attach to the terminals or contacts (FIGURE 5) located on the outside of the terminal board 30. The terminal board 30 has a third positioning surface or abutment 40 which cooperates with the positioning surface 38 to form a recess or channel for positioning rear end of the center bar 11. The positioning surfaces 36 and 38 similarly position rear end of the center bar 12.

The plate 32 is contrasted with the terminal board 30 in that it only serves to position the front ends of the center bars 11, 12 during the assembly of the magnetic head. To this end the positioning plate 32 has positioning surfaces or abutments 42, 44 and 46 located thereon. These positioning surfaces are substantially identical to those placed on the terminal board 30. It should be understood that the positioning plate 32 is removed from the magnetic head assembly by a machining operation following the potting of the head assembly. All of the positioning surfaces that appear on the terminal board 30 and the positioning plate 32 have a dimension D that is narrower than the dimension E of the center bar numbers 11 and 12. This dimensioning of the parts enables the channel members 14 and 16 to intimately contact the center bars 11 and 12 and their associated gap spacers 17. This intimate contact enables a reliable and accurately dimensioned magnetic circuit to be completed through the C-shaped channel members 14 and 16, the gap spacers 17 and the center bars 11 and 12.

The entire assembly comprising the center bars 11, 12, the channel members 14 and 16, the gap spacers 17, the terminal board 30, and the positioning plate 32 is placed on a base 47 having a sand-blasted, roughened or serrated surface 48. The roughened surface 48 enhances the adherence between the base 47 and the plastic material or epoxy resin that eventually surrounds the center bars 11 and 12. When the component parts are placed upon the base 47 the terminal board 30, the positioning plate 32 and the channel members 14 and 16 should firmly abut the roughened surface 48. The confronting edge surfaces of the channel members 14 and 16 should also firmly abut the center bars 11 and 12 and their associated gap spacers 17. The front or right end face of center bars 11 and 12 and the channel members 14 and 16 should be aligned with the base 47 so that the surfaces 50 and 52 of the channel members 14 and 16 are aligned with the surfaces 54 and 56 of the base while the surfaces 58 of the center bars 11 and 12 are substantially aligned with the surface 60 of the base. The other surfaces of the channel members 14 and 16 and the front surface of the board should be aligned in a similar manner with the confronting surfaces of the channel members 14 and 16 bearing against the enclosed bars 11 and 12 in magnetic bearing relation.

With the component parts of the magnetic head assembly located as described above, the entire assembly is positioned in a potting die or fixture which serves to maintain the parts in proper alignment while a portion of the assembly is capsulated or potted in a plastic material such as an epoxy resin. The procedure process for capsulating a member in a plastic is well known and taught in U.S. Patent 2,768,866 issued to O. Kornei on Nov. 6, 1956.

Figure 2:
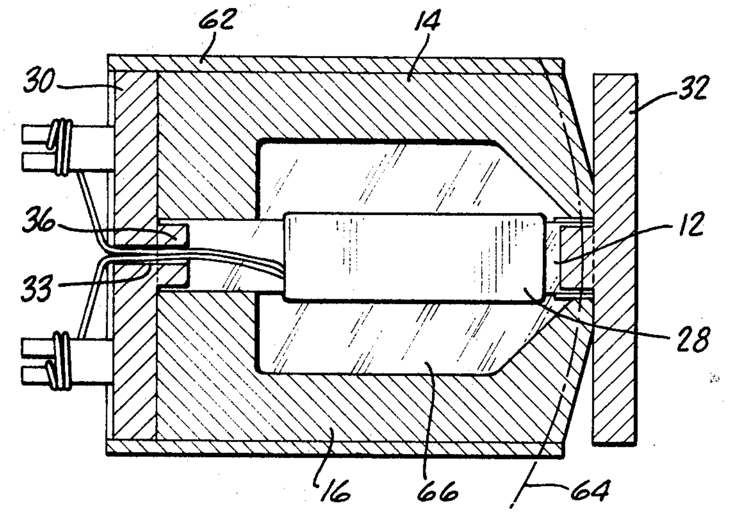
FIGURE 2 is a plan view, in section, of the magnetic head assembly after the molding or potting operation.
Figure 3:
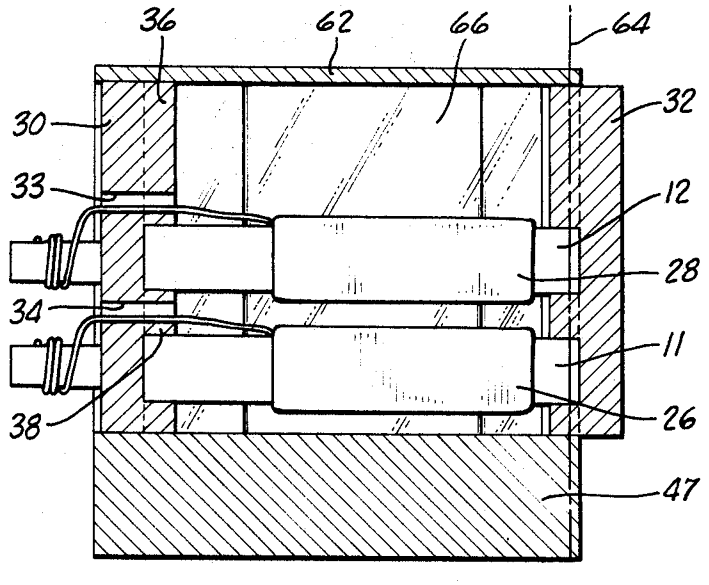
FIGURE 3 is a side elevation view, in section, of the magnetic head assembly after the molding or potting operation.

In FIGURES 2 and 3 where the magnetic head assembly is shown following the potting process it is seen that the epoxy resin or potting material 66 surrounds the center bar members 11 and 12. This serves to position, hold and protect these members. The epoxy resin 66 also serves to hold the entire magnetic head assembly together. It should be obvious that the epoxy resin 66 may be regarded as a means for holding the assembly or the center bars and the channel members or core members in a fixed relationship.

After the completion of the potting operation a shield or shroud 62 that may be made from copper or any of the other well-known shielding materials is placed on the assembly so that it will surround three sides of the magnetic head assembly. With the shield 62 fixed in position by appropriate fastening means (not shown) the positioning plate 32, a portion of the channel members 14 and 16 and a portion of the base 47 are removed by a machining operation. A typical manner in which the channel members 14 and 16, the position plate 32 and the base 47 are machined is shown by the broken line 64 in FIGURE 2. Following the machining operation the surface of the magnetic head assembly is finished by an appropriate finishing operation which enables a storage medium or magnetic tape to be readily moved over the head assembly in the usual manner.

Figure 4:
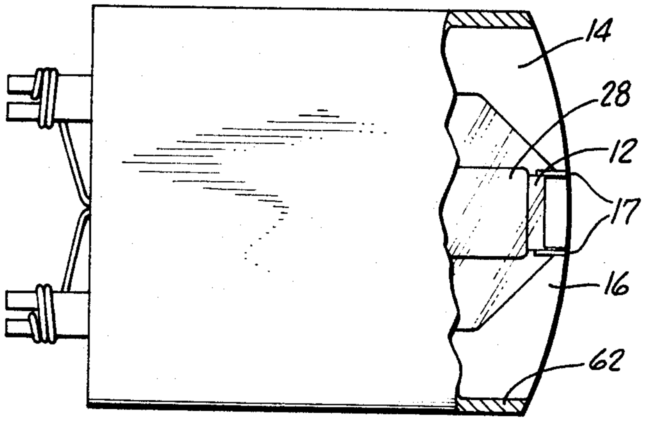
FIGURE 4 is a partially cut away plan view of the finished magnetic head assembly.
Figure 5:
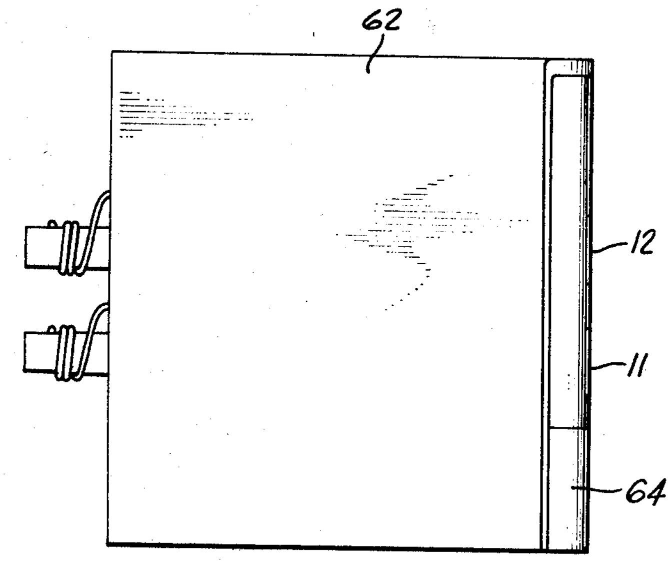
FIGURE 5 is a side elevation view of the finished magnetic assembly.

The finished magnetic head assembly is shown in FIGURES 4 and 5. This assembly has two magnetic circuits or paths completed via the channel members 14 and 16, the center bars 11 and 12 and the gap spacers 17. The gap spacers 17 form two nonmagnetic gaps in each magnetic circuitry which facilitate the removal of any recorded signal from the associated tape when the coils 26 and 28 are energized. The coils 26 and 28 may be energized separately or conjointly. The channel members 14 and 16 form part of the magnetic path completed by center bar 11 as well as part of the magnetic path completed by the center bar 12. This common core or pole structure is an important feature of the magnetic head assembly. It should be understood that notwithstanding the common core structure there is substantially no cross-talk between the magnetic paths defined by center bars 11 and 12 as the flux travels along the shortest or lowest reluctance path.

From the above detail written description it can be seen that the track width, and the number of tracks can readily be changed according to the requirements of the particular machine or track format by merely changing the dimensions of the center bar and by placing additional center bars across the channel members. The plates 30 and 32 would be changed accordingly. This feature enables different head assemblies to be easily and economically manufactured. It also enables the same dies or molding fixtures to be utilized to manufacture a number of different head assemblies. The potting of the assembly combines with the other features to form a reliable magnetic head assembly that could be manufactured at a substantial cost savings.

While the above detailed description has shown, described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an erase head for removing signals from a magnetic medium having a known track format, the combination comprising:

a two part, magnetizable core means substantially defining an enclosure and having vertical, opposed surfaces at the front and vertical, opposed surfaces at the rear;

magnetizable pole bar means having a front end and a rear end with the side faces thereof positioned between the front and rear opposed surfaces, respectively, of said core means and extending horizontally across said enclosure;

a pair of non-magnetizable spacer means, each being sandwiched between one of said front opposed surfaces of said core means and the adjacent side face of said front end of said pole bar means, to define two magnetic gaps;

non-magnetic positioning means engaging the top and bottom of at least one end of said pole bar means to establish a predetermined vertical positioning with respect to said core means in accordance with said track format, said positioning means being located between said opposed surfaces of said core means and having a width less than the width between side faces of the pole bar means to ensure intimate contact of said side faces of said pole bar means with the surfaces adjacent said side faces; and, a mass of non-magnetic, solidified material filling the enclosure.

2. A combination of claim 1, in which:

said core means and said pole bar means are made of ferrite material.

3. A combination, as defined in claim 1, in which:

said core means is made of a ferrite material.

4. A combination, as defined in claim 1, in which:

said pole bar means is made of a ferrite material.

5. A combination, as defined in claim 1, in which:

each part of said core means is a C-shaped channel member.

6. A combination, as defined in claim 1, which includes:

non-magnetic positioning means at both ends of said pole bar means.

7. A combination, as defined in claim 1, which includes:

a rear insulative terminal plate disposed across the rear of said core means, the non-magnetic positioning means being formed integral with said plate and projecting forwardly therefrom between the vertical, opposed rear surfaces of said core means.

8. A combination, as defined in claim 1, in which:

said enclosure is further defined by a base member having an upper surface for receiving said core means, said upper surface being roughened to enhance the adhesion of said mass of enclosure-filling material.

9. A combination, as defined in claim 1, in which:

said pole bar means includes a plurality of parallel pole bars, said non-magnetic positioning means establishing a predetermined vertical spacing between said bars and with respect to said core means.

10. A combination, as defined in claim 9, which includes:

non-magnetic positioning means at both ends of said pole bars.

References Cited

UNITED STATES PATENTS

| | | | |
|---|---|---|---|
| 3,094,772 | 6/1963 | Duinker | 179—100.2 X |
| 3,222,461 | 12/1965 | Wood et al. | 179—100.2 |
| 3,224,073 | 12/1965 | Peloschek | 179—100.2 X |
| 3,233,046 | 2/1966 | Moehring | 179—100.2 |

FOREIGN PATENTS

| | | |
|---|---|---|
| 911,220 | 11/1962 | Great Britain. |

BERNARD KONICK, *Primary Examiner.*

V. P. CANNEY, *Assistant Examiner.*